United States Patent
Carman (10) Patent No.: US 7,114,078 B2
(45) Date of Patent: Sep. 26, 2006

(54) METHOD AND APPARATUS FOR STORAGE OF USERNAMES, PASSWORDS AND ASSOCIATED NETWORK ADDRESSES IN PORTABLE MEMORY

(75) Inventor: Gene Carman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 476 days.

(21) Appl. No.: 09/944,540

(22) Filed: Aug. 31, 2001

(65) Prior Publication Data

US 2003/0046567 A1 Mar. 6, 2003

(51) Int. Cl.
*H04L 9/32* (2006.01)
*H04L 9/10* (2006.01)
(52) U.S. Cl. .................... 713/185; 713/183; 713/193
(58) Field of Classification Search ............. 713/182, 713/185, 159
See application file for complete search history.

(56) References Cited

U.S. PATENT DOCUMENTS

| | | | | |
|---|---|---|---|---|
| 5,282,247 A | * | 1/1994 | McLean et al. | 711/164 |
| 5,982,520 A | * | 11/1999 | Weiser et al. | 398/126 |
| 6,079,019 A | * | 6/2000 | Fukuzumi | 713/193 |
| 6,182,217 B1 | * | 1/2001 | Sedlak | 713/172 |
| 6,343,284 B1 | * | 1/2002 | Ishikawa et al. | 705/67 |
| 6,408,389 B1 | * | 6/2002 | Grawrock et al. | 713/183 |
| 6,738,901 B1 | * | 5/2004 | Boyles et al. | 713/159 |
| 6,792,422 B1 | * | 9/2004 | Stride et al. | 707/6 |
| 6,802,007 B1 | * | 10/2004 | Canelones et al. | 713/193 |
| 6,807,532 B1 | * | 10/2004 | Kolls | 705/10 |
| 2001/0032237 A1 | * | 10/2001 | Miyake et al. | 709/203 |

* cited by examiner

*Primary Examiner*—Gilberto Barron
*Assistant Examiner*—Venkat Perungavoor
(74) *Attorney, Agent, or Firm*—Philips Wadsworth; Charles D. Brown; Howard H. Seo (57) ABSTRACT

The memory card is comprised of memory that stores a user name and password for each respective network address or universal resource locator (URL). The information is encrypted to preclude unauthorized access to the memory. A controller controls operation and access to the card. A bus interface couples the card to various buses, such as a universal serial bus. When the card is attached to an electronic device that is accessing a particular URL, the consumer enters the password or other unlock request information. Once the unlock request is validated, the user name and password associated with that particular URL is transmitted to the browser on the electronic device that is requesting the information.

28 Claims, 6 Drawing Sheets

| URL ←601 | USERNAME ←602 | PASSWORD ←603 |
|---|---|---|
| WWW.EBAY.COM | MAVERICK | EAGLE1 |
| WWW/BOOKS.COM | GOOSE | 06502 |

610 points to the first data row.

FIG. 6

METHOD AND APPARATUS FOR STORAGE OF USERNAMES, PASSWORDS AND ASSOCIATED NETWORK ADDRESSES IN PORTABLE MEMORY

BACKGROUND OF THE INVENTION

1. Field of the Invention

The present invention relates generally to electronic password protection. Particularly, the present invention relates to the storing of electronic passwords in a portable memory device.

2. Description of the Related Art

With the increasing use of the Internet for commercial purposes, the average consumer is being overwhelmed with "usernames" and their associated passwords. For example, to log on to an Internet news site, the consumer may have to generate their own six to twelve character user name as well as a password. These phrases must then be used whenever the consumer wishes to log on to that particular web site.

Most web sites require or at least strongly suggest the use of usernames and passwords. Financial transactions, in the interest of security, require such protection. This causes the consumer to face many problems associated with user name and password use.

For example, the web site may generate a user name and/or password for the consumer. These phrases are typically very cryptic, making them difficult to remember.

If the consumer desires to access dozens of web sites that require usernames and passwords, he or she must track each of these sites and its associated user name/password. The consumer may decide to write the information down. However, losing this information would then leave the protected information vulnerable to misuse. For example, if the consumer lost his or her user name and password for Internet banking, those accounts may be accessed by whoever finds the codes.

For convenience, the consumer may decide to make all of his or her user name/passwords the same for each web site. However, various web sites have different rules for the generation of such protection. One site may require that the password be only four characters and include at least one number. If the consumer has already generated a generic password for other sites that is six alphabetic characters in length, this will cause the consumer to generate and track the new password. There is a resulting need for a portable memory device that stores and protects all of a consumer's usernames and password protection information.

SUMMARY OF THE INVENTION

The memory card of the present invention provides a consumer with encrypted, portable storage capability for all of their usernames and associated passwords. After the data is unlocked and/or decrypted, the user name and associated password is provided to the requesting universal resource locator (URL) through an electronic device's browser software.

The memory card comprises memory that stores the plurality of usernames and each user name's respective password. Each user name and password is associated with a predetermined network address or URL. An input/output device or bus interface couples the card to an electronic device, such as a computer, PDA, or cellular telephone, to allow access to the memory from that electronic device.

A controller is coupled to both the memory and the input/output device. The controller is a processor or microcontroller that controls the operation of the smart memory card. The controller runs processes that permits or denies access to the information stored in the memory.

DETAILED DESCRIPTION OF THE PREFERRED EMBODIMENT

The present invention provides for safe storage and easy recall of usernames along with their associated passwords or personal identification numbers (PIN). The stored information is encrypted to provide security against invalid access if the smart memory card is lost.

Figure 1:
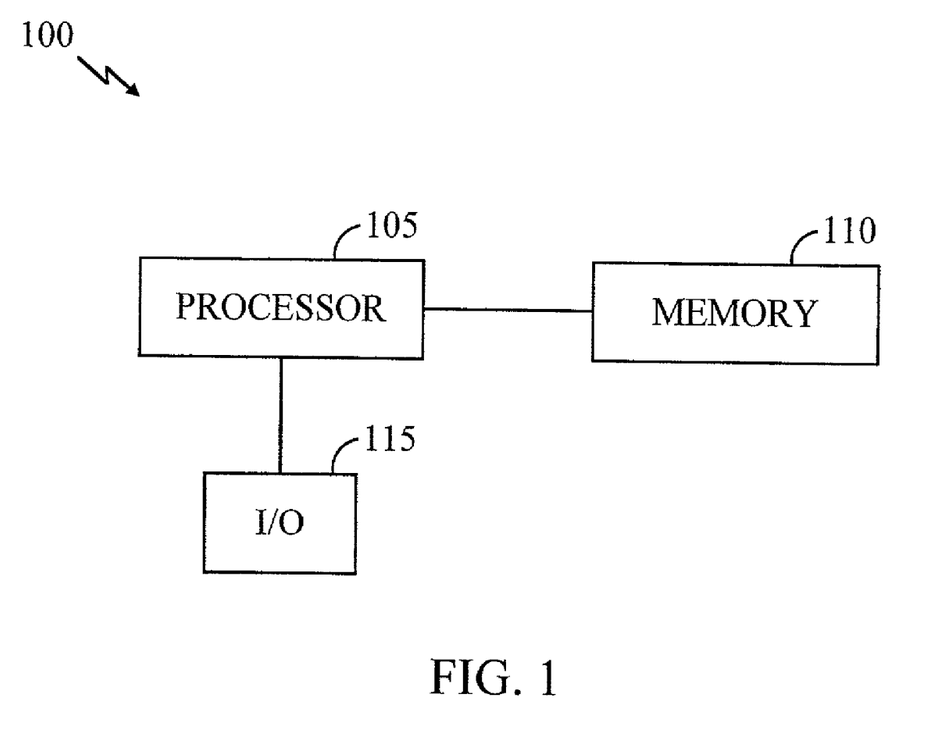
FIG. 1 shows a block diagram of a memory card of the present invention.

FIG. 1 illustrates a block diagram of the memory card apparatus (100) of the present invention. The apparatus is comprised of memory (110) for storing the usernames and their associated passwords. In the preferred embodiment, the memory (110) is a flash memory that stores data even after power has been removed. Alternate embodiments use other memory technologies such as micro hard drives.

An input/output device (115) couples the memory card to another electronic device, as described subsequently in reference to the embodiments of FIGS. 2 and 3. In the preferred embodiment, the input/output device (115) is a universal serial bus (USB) compliant interface. Alternate embodiments use other types of bus interfaces such as a Personal Computer Memory Card International Association (PCMCIA) compliant bus interface or a FireWire (IEEE 1394) compliant bus interface.

The USB and PCMCIA bus structures provide the data paths necessary for the memory card to communicate with any device to which it is coupled. The bus also provides the power required to operate the memory card so that a separate power supply is not required.

In the preferred embodiment, the memory card is controlled by a controller (105) such as a microprocessor or microcontroller. The controller (105) is coupled to the memory (110) and the input/output device (115) in order to control access to the memory by any electronic devices coupled to the input/output device (115). The controller (105) performs the processes of the present invention that encrypt, decrypt, and verify the validity of any access requests to the memory (110).

In alternate embodiments, the controller functions are performed by the device to which the memory card is coupled. For example, if the memory card is coupled to the USB port of a cellular telephone, the cellular telephone's processor provides the necessary control to store and recall the usernames and their associated passwords.

Figure 2:
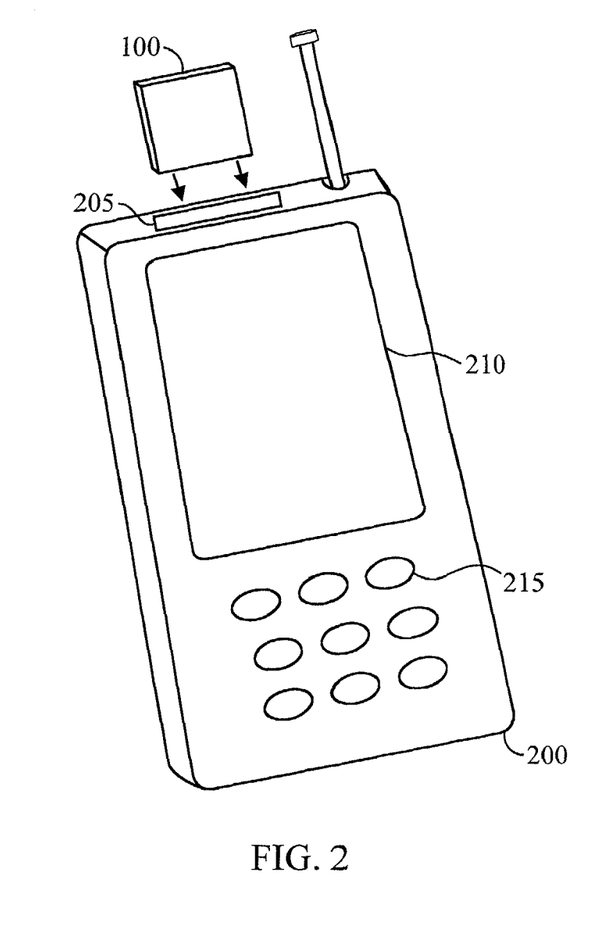
FIG. 2 shows an embodiment of the memory card of the present invention as used with a cellular telephone.

FIG. 2 illustrates one use of the memory card apparatus (100) of the present invention. This embodiment couples the apparatus (100) to a portable radiotelephone (200) such as a cellular telephone. In the preferred embodiment, the cellular telephone (200) is Wireless Access Protocol (WAP) compliant so that a user can access the Internet using the telephone (200).

In this embodiment, the WAP-compliant telephone (200) has a large screen (210) to display Internet pages. The keypad (215) is used to enter telephone numbers or other data and to control a cursor on the screen (210). The memory card (100) is inserted into an expansion port (205) on the telephone. In this embodiment, the expansion port (205) is shown on the top of the telephone (200). However, this port (205) can be located anywhere on the telephone (200).

Once inserted into the expansion port (205), the electrical contacts on both the telephone (200) and the memory card (100) are mechanically connected. This connection enables the controller of the telephone (200) to communicate with the controller of the smart memory card (100).

The communication between the telephone (200) and the memory card (100) includes the telephone (200) being able to write to the smart memory card as well as read from it. For example, when a consumer accesses a web page for the first time it may request a username and password. Since the consumer has not entered a user name and password for this web page, the consumer uses the keypad (215) to enter this data. The telephone's browser or operating system then stores both the username and password with the URL of the web page into the memory card's memory.

In the preferred embodiment, the expansion slot (205) on the telephone (200) is a USB port. In this case, the connector on the smart memory card (100) is also a USB connector. Alternate embodiments use other types of connectors and interfaces such as PCMCIA and FireWire.

The USB port of the telephone (200) transfers the power required for operation of the smart memory card (100). This enables the smart memory card to run off the telephone (200) battery and permits the smart memory card to be smaller and lighter than if a battery was required.

Figure 3:
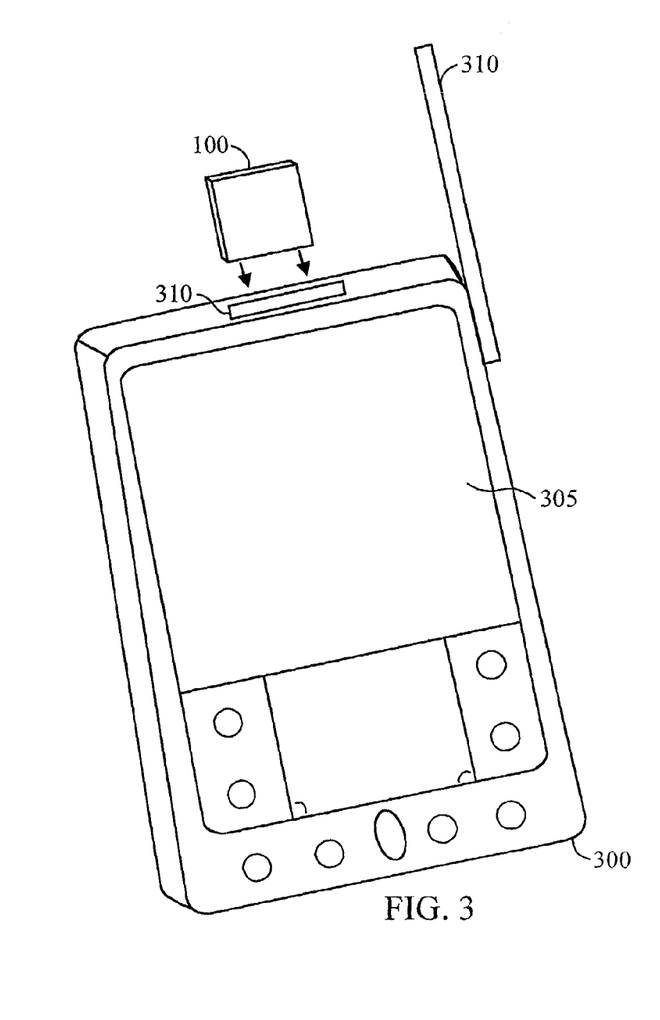
FIG. 3 shows another embodiment of the memory card of the present invention as used with a personal digital assistant.

FIG. 3 illustrates another use of the present invention. This embodiment couples the memory card apparatus (100) to a personal digital assistant (PDA) (300). An example of a personal digital assistant is PALM COMPUTING's PALM M505. Such a PDA (300) has an expansion port (310) that is used to couple the smart memory card's bus interface to the PDA.

The PDA (300) is comprised of a large touchscreen (305) to display Internet web pages as well as other information. The touchscreen (305) is also used to enter and display information such as to access the smart memory card's memory and to write additional usernames and passwords with their corresponding URLs, as discussed above in the embodiment of FIG. 2.

Both of the embodiments illustrated in FIGS. 2 and 3 use an expansion slot (USB port) into which the memory card is inserted. However, in another embodiment, a cable is used to connect the memory card to the electronic device.

While the embodiments discussed above use the memory card of the present invention with portable electronic devices, the memory card can also be coupled to a desktop computer to perform the same function.

Most modern computers are equipped with USB ports to enable peripherals to communicate with the computer. When the memory card is coupled to the computer's USB port, the computer's operating system goes through an automatic recognition process to load the driver for the memory card. This driver can be provided in the operating system by the operating system manufacturer, downloaded off of the Internet, or loaded into the computer or other electronic device through a computer connection.

Figure 4:
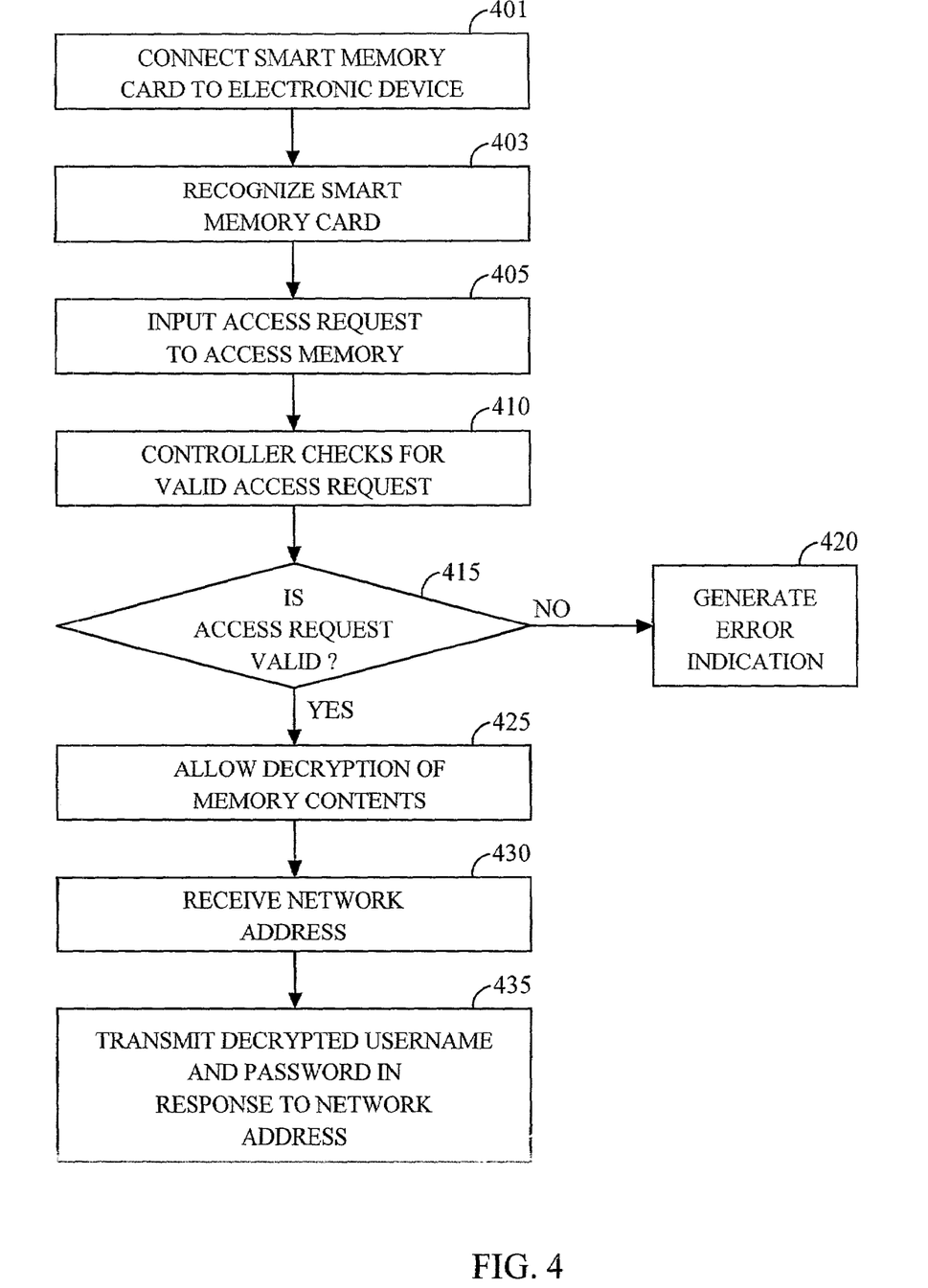
FIG. 4 shows a flowchart of a memory card access process of the present invention.

FIG. 4 illustrates a flowchart of a memory card access process of the present invention. The memory card is coupled to the electronic device (e.g., telephone, PDA, computer) through the bus interface (step 401). The electronic device then attempts recognition of the memory card (step 403) by a process that loads the driver for the card. As discussed above, this driver is either part of the electronic device's operating system or loaded separately (i.e., by connecting the electronic device to a computer and downloading the driver).

The consumer then enters a request to access the memory card's memory (step 405). In the preferred embodiment, the consumer simply enters a password or PIN to unlock the card and/or decrypt the information stored in memory. Alternate embodiments use other forms of access requests such as a digitized scan of a fingerprint or a digitized scan of a retina.

If the memory card is comprised of a controller, it checks for a valid password, PIN, or digitized scan by comparing the input information with a previously stored file (step 410). If the device to which the memory card is coupled is performing the control function, that device checks for the valid password.

If the input access request is not valid (step 415), an error indication is generated (step 420). This indication can include a tone, an error display on the electronic device, or any other way to indicate the error condition.

If the input access request is valid (step 415), the controller of the memory card decrypts the memory contents (step 425). This step may include decrypting the entire memory contents or simply decrypting the information as the electronic device requests it.

The memory card then receives a password request from a network address (e.g., URL) (step 430). The memory card controller then looks up the URL in memory to determine if the URL is present in the memory card and has an associated user name and password. If the URL is valid, the decrypted user name and password are transmitted to the requesting address (step 435).

While the embodiments discussed above use the memory card as a storage device for usernames, passwords, and the associated URLs, an alternate embodiment uses the card as an electronic cash storage device or other monetary account information. The consumer can set up an account with an Internet banking service such that the banking service can charge the consumer's credit card or debit a bank account. When the consumer accesses the service's web page, the monetary value stored in the smart memory card can be increased to an amount agreed upon between the consumer and the Internet banking service.

Once the memory card has a stored monetary value, the consumer can access Internet shopping pages that accept the smart memory card's monetary information as payment. Once the consumer has entered the check-out page of the website, the amount of the purchase is deducted from the smart memory card.

Figure 5:
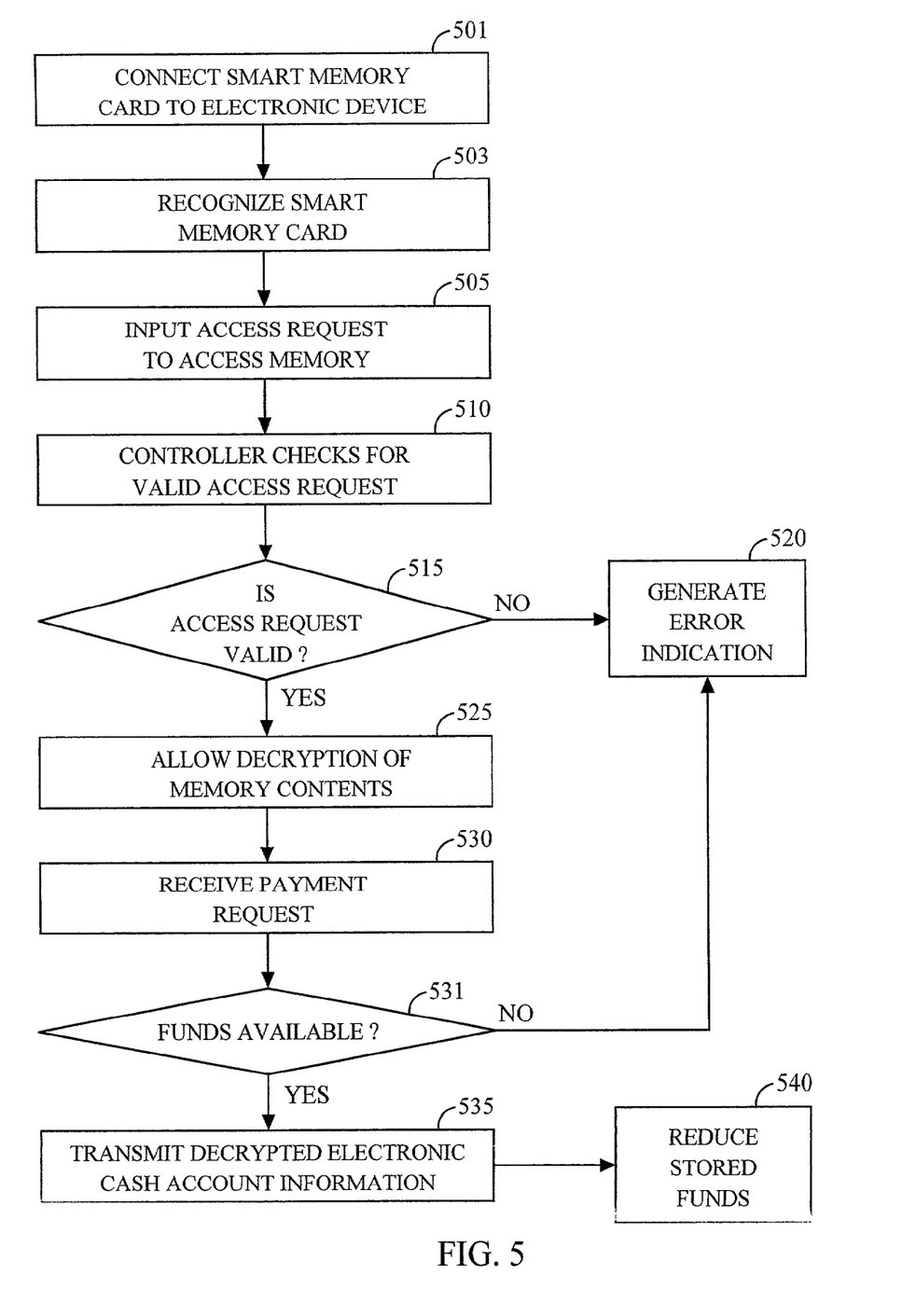
FIG. 5 shows a flowchart of a memory card electronic cash process of the present invention.

FIG. 5 illustrates a flowchart of the alternate embodiment process in which the memory card is an electronic cash device. The memory card is coupled to the electronic device (e.g., telephone, PDA, computer) through the bus interface (step 501). The electronic device then attempts recognition of the memory card (step 503) by a process that loads the driver for the card.

The consumer then enters a request to access the memory card's memory (step 505). In the preferred embodiment, the consumer simply enters a password or PIN to unlock the card and/or decrypt the information stored in memory. Alternate embodiments use other forms of access requests such as a digitized scan of a fingerprint or a digitized scan of a retina.

The memory card controller checks for a valid password, PIN, or digitized scan by comparing the input information with a previously stored file (step 510). If the input access request is not valid (step 515), an error indication is generated (step 520). This indication can include a tone, an error display on the electronic device, or any other way to indicate the error condition.

If the input access request is valid (step 515), the controller of the memory card decrypts the memory contents (step 525). This step may include decrypting the entire memory contents or simply decrypting the payment information as the electronic device requests it.

The memory card then receives the request for payment from the web page or other network address (step 530). The memory card controller compares the funds available with the amount of the payment request to determine if sufficient funds are available to complete the transaction (step 531). If there are not sufficient funds available (step 531), an error indication is generated (step 520).

If sufficient funds are available (step 531), the decrypted electronic cash payment data, such as account number and value, are transmitted to the requesting web site (step 535). The controller then reduces the stored funds by the amount transmitted (step 540).

Figure 6:
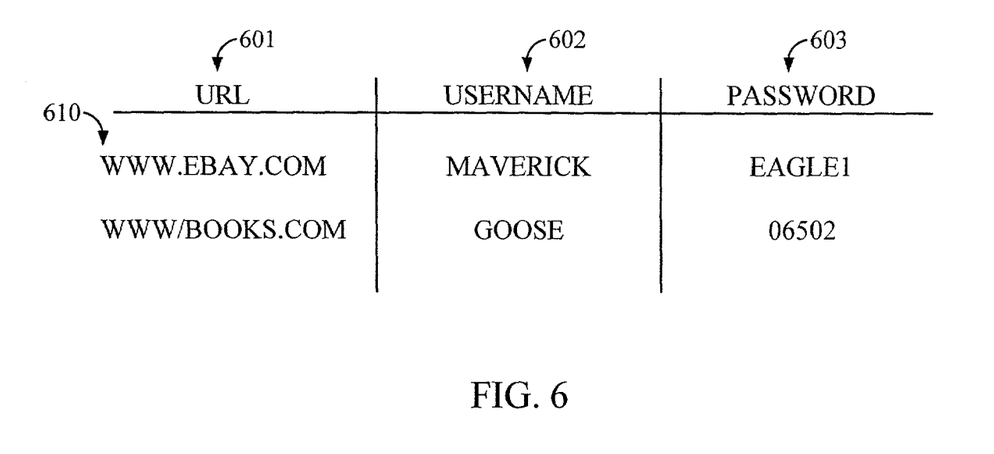
FIG. 6 shows an example of a user name/password table of the present invention.

In the preferred embodiment, the user name and password information stored in the memory card is stored in a table format, as illustrated in FIG. 6. For example, the first column of data (601) lists the URLs. The second column of data (602) lists the usernames associated with each URL. The third column of data (603) lists the associated passwords. Therefore, each row of data (610) is a URL, its associated user name, and the user name's associated password or PIN.

When an accessing device reads the memory to access a user name and password, the accessing device goes through the list of URLs to find the appropriate one. Once the URL is found, the user name and password are now available.

In one embodiment, the URLs are stored in the format show in FIG. 6. Alternate embodiments store the IP addresses for each desired location.

The memory card may further act as a "key" in accessing certain URLs. For example, a Web site may allow only certain subscribers to access a page. To limit access by only the subscribers, the memory card must be present in the computer, PDA, or telephone so that the Web site can issue instructions in HTML to the computer to access the memory card for the appropriate user name and password.

In the memory card may be stored a user name and password that are each hundreds of bytes in length such that memorizing them would be almost impossible. This would increase the Web site's defense to "hackers" who go through all possible combinations of a password or user name in order to gain access.

The "key" concept can also be used in the electronic cash embodiment of FIG. 5. If the memory card with the proper funds, user name, and password is not detected by the Web site that is being accessed, the transaction is not allowed.

In summary, the present invention provides a consumer with encrypted, portable storage capability for all of their usernames and associated passwords. The memory card of the present invention enables the consumer to enter one password to unlock and/or decrypt the contents of the card. When the card receives a valid password request from a known URL, it transmits the corresponding user name and password to access the web page.

The invention claimed is:

1. A memory card comprising:
   memory that stores a plurality of usernames and passwords each username and password associated with a predetermined network address;
   an input/output device that enables data to be entered into the memory and data to be extracted from the memory; and
   a controller within the memory card, coupled to both the memory and the input/output device, that controls operation of the memory card, the controller comprising means for receiving and determining a validity of an access request and means for controlling access to the usernames, passwords, and associated network addresses through the input/output device in response to a valid request from a first network address for an associated first username and first password, the means for controlling access selectively decrypting information in the portion of memory having the associated first username and first password in response to the valid request while allowing a distinct portion of the memory to remain encrypted.

2. The memory card of claim 1 wherein the memory comprises flash memory.

3. The memory card of claim 1 wherein the input/output device is compatible with a universal serial bus.

4. The memory card of claim 1 wherein the input/output device is compatible with a Personal Computer Memory Card International Association (PCMCIA) bus.

5. The memory card of claim 1 wherein the controller is a microprocessor capable of running processes for operation of the memory card.

6. The memory card of claim 5 wherein the processes for operation comprise encryption processes, decryption processes, and memory access processes.

7. The memory card of claim 1 wherein the predetermined network address is a universal resource locator for a web site.

8. A memory card comprising:
   memory that stores a plurality of usernames and a password corresponding with each username, each username and its corresponding password associated with a predetermined universal resource locator of a web site;
   a bus interface that enables data to be entered into the memory and data to be extracted from the memory, the bus interface receiving power for energizing the memory card; and
   a controller within the memory card, coupled to both the memory and the bus interface, that receives a password via the bus interface, determines validity of the password, and controls access to the memory card in response to a valid password, the controller comprising means for encrypting and decrypting information written to the memory card through the bus interface, the controller selectively decrypting information in the portion of memory having a first username and a corresponding first password in response to a valid request originating from the universal resource locator, while allowing a distinct portion of the memory to remain encrypted.

9. The memory card of claim 8 wherein the memory comprises a disk drive.

10. The memory card of claim 8 wherein the controller permits access to the plurality of usernames and associated passwords that are stored in the memory when the valid access password is entered.

11. The memory card of claim 8 wherein the controller comprises means for interacting with an electronic device that is coupled to the bus interface.

12. The memory card of claim 11 wherein the electronic device is a computer comprising a universal serial bus compatible interface that couples to the bus interface, the computer comprising means for entering the valid password.

13. The memory card of claim 11 wherein the electronic device is a personal digital assistant comprising a universal serial bus port that couples to the bus interface, the personal digital assistant comprising means for entering the valid password.

14. The memory card of claim 11 wherein the electronic device is a portable telephone that has a universal serial bus port that couples to the bus interface, the portable telephone comprising means for entering the valid password.

15. The memory card of claim 8 wherein the memory further comprises electronic cash account information.

16. A method for accessing usernames and their associated passwords in a memory card, the method comprising the steps of:
  receiving a password at an input interface of the memory card;
  determining, within the memory card, if the password is valid;
  receiving a request for a username and corresponding password from a network address;
  decrypting a portion of memory having the username and corresponding password in response to the request, while allowing a distinct portion of memory to remain encrypted;
  retrieving from memory within the memory card, the username and corresponding password associated with the network address; and
  if the password is valid, transmitting the username and corresponding password to the network address.

17. The method of claim 16 wherein the network address is a Universal Resource Locator for an Internet web site.

18. A method for accessing usernames and their associated passwords in a smart memory card, the method comprising the steps of:
  receiving an access request;
  determining, within the smart memory card, if the access request is valid;
  receiving a request for a username and associated password from a network address;
  decrypting a portion of memory having the username and associated password in response to the request, while allowing a distinct portion of memory to remain encrypted;
  retrieving from memory within the smart memory card, the username and corresponding password associated with the network address; and
  if the access request is valid, transmitting the username and associated password to the network address.

19. The method of claim 18 wherein the access request is a digitized scan of a fingerprint.

20. The method of claim 18 wherein the access request is a digitized scan of a retina.

21. The method of claim 18 and further including the step of supplying the username and associated password to the network address.

22. A method for accessing monetary account information in a smart memory card, the method comprising the steps of:
  receiving an access request;
  determining, within the smart memory card, if the access request is valid;
  receiving a request for payment data from a requesting network address;
  retrieving requested payment data from memory within the smart memory card; and
  if the access request is valid, transmitting the requested payment data to the requesting network address.

23. The method of claim 22 wherein the access request is a digitized scan of a retina.

24. The method of claim 22 wherein the access request is a digitized scan of a fingerprint.

25. The method of claim 22 wherein the access request is a password.

26. The method of claim 22 wherein the monetary account information is encrypted.

27. The method of claim 26 and further including the step:
  if the access request is valid, decrypting the monetary account information.

28. The method of claim 22 wherein the step of transmitting the requested payment data comprises the steps of:
  if the access request is valid, determining if an amount of the request for payment is larger than a value of the monetary account information; and
  if the amount of the request is less than the value of the monetary account information, allowing transmission.

* * * * *